United States Patent [19]

Williams et al.

[11] 4,239,177
[45] Dec. 16, 1980

[54] ELECTRICALLY OPERATED VALVE WITH BALANCED PORT DESIGN

[75] Inventors: Steven E. Williams, St. Louis, Mo.; Bernard L. Kunz, Collinsville, Ill.

[73] Assignee: Emerson Electric Co., St. Louis, Mo.

[21] Appl. No.: 897,951

[22] Filed: Apr. 20, 1978

[51] Int. Cl.³ .................... F16K 31/04; G05D 23/08
[52] U.S. Cl. .................... 251/11; 60/529; 236/68 R; 236/101 B; 251/282
[58] Field of Search ............ 60/528, 529; 236/68 R, 236/101 B; 251/11, 44, 63, 63.6, 282

[56] References Cited

U.S. PATENT DOCUMENTS

| 686,766 | 2/1901 | Bickel | 251/11 |
|---|---|---|---|
| 1,867,004 | 7/1932 | Hacker et al. | 251/282 |
| 2,329,001 | 9/1943 | Robinson | 251/44 |
| 2,516,996 | 8/1950 | Jensen | 251/282 |
| 2,635,634 | 4/1953 | Thurber, Jr. | 251/44 |
| 2,897,836 | 8/1959 | Peters et al. | 251/282 |
| 2,931,616 | 4/1960 | White et al. | 251/282 |
| 3,087,705 | 4/1963 | Hamilton | 251/282 |
| 3,121,315 | 2/1964 | Matthies | 251/11 |
| 3,141,386 | 7/1964 | Loughridge | 251/63 |
| 3,177,892 | 4/1965 | Grandstaff | 251/282 |
| 3,189,277 | 6/1965 | Fox | 236/101 B |
| 3,967,781 | 7/1976 | Kunz | 236/101 B |

FOREIGN PATENT DOCUMENTS 940679  10/1963  United Kingdom .................. 251/63.6

Primary Examiner—Martin P. Schwadron
Assistant Examiner—G. L. Walton
Attorney, Agent, or Firm—Polster, Polster and Lucchesi

[57] ABSTRACT

A regulator valve having a balanced port construction is provided with a balanced piston design, the piston being operated under positive control in all valve positions. The piston regulates fluid flow through the valve. The piston is operatively connected to a heat motor, and the electrical energy input to the heat motor is used to adjust piston position. Because of the balanced piston design, valve operation is dependent solely upon electrical energy input to the heat motor, and precise control of a refrigeration system, for example, may be maintained.

6 Claims, 2 Drawing Figures

ELECTRICALLY OPERATED VALVE WITH BALANCED PORT DESIGN

BACKGROUND OF THE INVENTION

This invention relates to valves for modulating fluid flow in refrigeration systems. While the invention is described with particular detail with respect to such systems, those skilled in the art will recognize the wider applicability of the valve disclosed hereinafter.

Various varieties of valves for modulating fluid flow in refrigerating systems are known in the art. In general, present mechanical valves used as evaporator regulators or expansion valves in a refrigeration system accomplish their control function by using a pressure actuated pilot valve for controlling valve position. Operation of the pilot valve, in turn depends upon the pressure or temperature sensed at one particular point in the system, depending upon the kind of sensor employed with the valve. While such valves work for their intended purpose, they are not without problems in applicational use. Thus, the fact that valve operation depends upon a single sensed system variable limits the valve capability. Likewise, valve operation can be dependent upon a variable which the valve is intended to control. Consequently, valve operation can be unstable during operating periods when valve operation should be most stable for best system efficiency. Such valves also are characterized by complicated and relatively expensive construction.

The invention disclosed hereinafter overcomes these prior art deficiencies by providing a versatile electrically operated valve which is able to accurately and efficiently regulate temperatures, flows and pressures of a controlled system in response to any of a variety of system parameters, those parameters being measured electrically. The movable valve member is balanced and independent of fluid pressures in the system. The movable valve member also always is in positive control, so that valve position is directly controlled by the system parameters being monitored. Because system parameters are measured and processed electrically, a number of points on the system can be utilized to generate the valve control signal.

One of the objects of this invention is to provide a valve giving precise control of a refrigeration system by regulating pressure and temperature in the system.

Another object of this invention is to provide a balanced port valve design which operates independently of fluid pressure in the system.

Another object of this invention is to provide a balanced port valve design in which the plunger of the valve is under direct control in all operating positions of the valve.

Another object of this invention is to provide a lower cost valve assembly.

Other objects of this invention will be apparent to those skilled in the art in light of the following description and accompanying drawings.

SUMMARY OF THE INVENTION

In accordance with this invention, generally stated, a valve is provided having a balance chamber design so that valve operation is independent of fluid pressure in the valve. In the preferred embodiment, a valve piston is operatively connected to a heat motor. A valve body, in which the valve piston operates, is designed to provide a first chamber and a second chamber on a first side of a valve port within the valve body. One of the chambers communicates with the inlet side of the valve, while the other chamber communicates with the outlet side of the valve. In operation, pressure forces on the piston are equalized, so that the heat motor alone is responsible for piston movement and position.

DESCRIPTION OF THE PREFERRED EMBODIMENT

Figure 1:
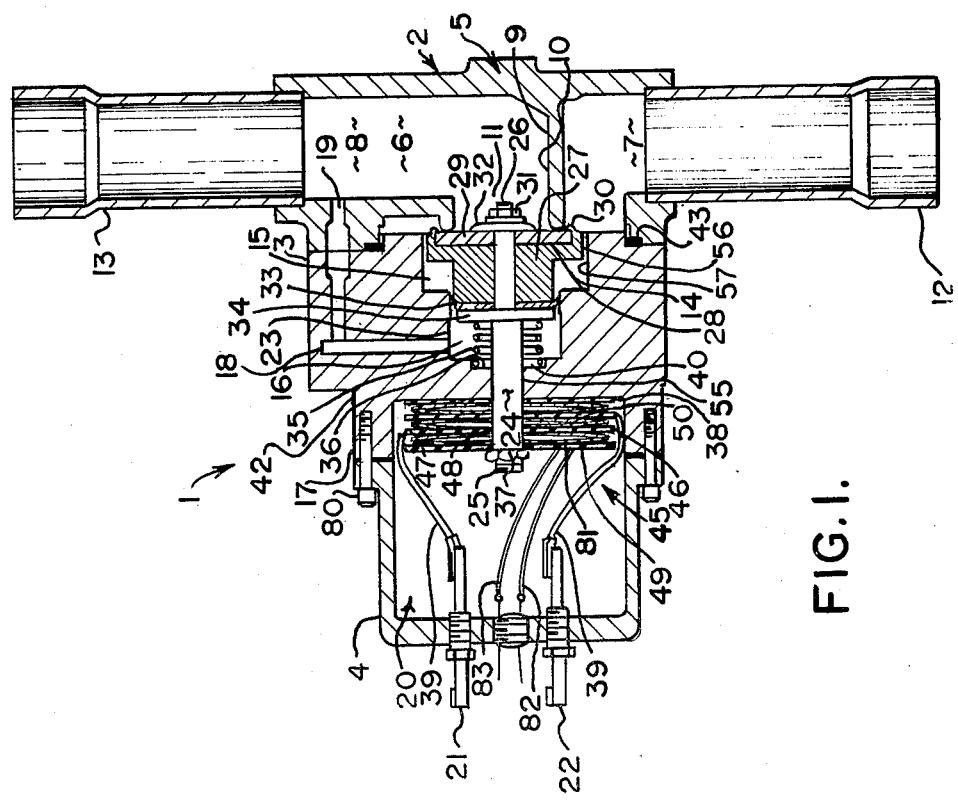
FIG. 1 is a sectional view of a first illustrative embodiment of valve of this invention.

Referring now to FIG. 1, reference numeral 1 indicates one illustrative embodiment of valve of this invention. The valve 1 includes a valve body 2, a top plate 3 and a cover 4.

The valve body 2 is formed from a tubular section 5 having an opening 6 through it. The valve body 2 has an inlet 7 and an outlet 8 communicating with the opening 6. The inlet 7 and outlet 8 are separated by a partition 9 located within the valve body 2. Partition 9, in the embodiment illustrated, is annular in plan, having an upper end 10 delimiting a central opening 11. The partition 9 preferably is integrally constructed with the tubular section 5. However, partition 9 may be manufactured separately and inserted within the tubular section 5, if desired.

Inlet 7 and outlet 8 are provided with tube stubs 12 and 13 respectively. The stubs are attached to the valve body 2 by any convenient method. Brazing or welding works well, for example. In refrigeration systems where the valve 1 finds application, the tube stub 12 is connected to the high-pressure side of the system, while the tube stub 13 is connected to the low pressure side of the system.

The top plate 3 has a central chamber 14 formed in it. The chamber 14 in turn is constructed so that it defines two distinct diametric sections along its axial length which delimit a first chamber part 15 and a second chamber part 16. An external wall 42 defines a hub 17 along an upper end of the plate 3. The hub 17 is axially aligned with the chamber parts 15 and 16 and the opening 11 in the valve body 2. Top plate 3 is attached to the valve body 2 by any convenient method and a suitable seal 43 preferably is provided to prevent fluid leakage along the plate 3-body 2 interface.

The top plate 3 also has a passage 18 formed in it, which communicates with the chamber part 16 on a first end of the passage. A second end of the passage 18 communicates with the outlet side 8 of the valve body 2 through an orifice 19 formed in the valve body 2.

The cover 4 is mounted to the top plate 3 along the hub 17 by conventional threaded fasteners 80. Other interconnection techniques are compatible with the broader aspects of this invention. The cover 4 delimits an enclosure for a heat motor 20 later described in greater detail. A pair of terminals 21 and 22 extend through the cover 4 in a conventional manner, and are utilized to connect the heat motor 20 to a source of electrical energy, not shown. A temperature feedback sensor 81 is electrically connected to a control device for operating the valve 1, not shown, along output conductors 82 and 83. The use and purpose of the sensor 81, and a control device used with it is described in greater detail in copending U.S. application Ser. No. 761,291, filed Jan. 21, 1977 and assigned to the assignee of the present invention. A heat motor similar to the heat motor 29 is shown in U.S. Pat. No. 3,967,781, also assigned to the assignee of the present invention.

A piston assembly 23 is mounted for movement along an opening 55 the top plate 3. Piston assembly 23 includes a shaft 24, a piston 27, and a resilient, annular member 29. Shaft 24 has a first end 25 and a second end 26. The piston 27 has a central opening in it, which is sized to pass the end 26 of the shaft 24.

Piston 27 also has an enlarged end 56 having a recess 28 formed in it. Recess 28 is sized to receive the resilient, annular member 29. The recess 28 is provided with a lip 30 having a smaller diameter than the diameter of the member 29. The lip 30 therefore frictionally engages and holds the member 29 after its insertion in the recess 28. The diameter of the member 29 is chosen so that it abuts the end 10 of the partition 9 in the closed position of the valve 1, the closed position being shown in FIG. 1.

The end 26 of the shaft 24 receives a conventional threaded nut 31 and a washer 32. The nut 31 clamps the washer 32 against the member 29 and the piston 27 in a conventional manner.

As shown in FIG. 1, the piston 27 is loose fitting with respect to an internal wall 57 defining the first chamber part 15 in the top plate 3, so that the chamber part 15 communicates with the inlet 7 and essentially is at the same pressure as the inlet 7. A seal 33 is mounted over the shaft 24, within the chamber part 16. The seal 33 closes the chamber part 16 from the chamber part 15, preventing fluid communication therebetween.

A spring stop 34 is mounted over the shaft 24 and is attached thereto by any convenient method. For example, the shaft 24 may have first and second diametric sections so that the stop 34 abuts an annular shoulder defined by the enlarged diameter portion of the shaft. Thereafter, the attachment of the nut 31 clamps the parts to one another to form an integral unit. Other interconnection techniques are compatible with the broader aspects of this invention.

A spring 35 is biased between the stop 34 and a top wall 36 of the top plate 3. The wall 36 defines a spring eng receiving receptacle 40 in the preferred constructional form of the invention, although the receptacle 40 may be eliminated in other embodiments of this invention or other structure substituted for the receptacle shown. In any case, the spring 35 is biased between the wall 36 and the stop 34, and exerts a force on the shaft 24 toward the closed position of the valve 1.

Heat motor 20 includes an electrically operable means 45 mounted to the shaft 24 along the end 25 thereof. The electrically operable means 45 includes a plurality of bimetallic discs 46 interleafed between a plurality of heater elements or heater means 47.

Each of the bimetallic discs 46 are annular in plan, having a central opening 48 through them. The bimetallic discs 46 conventionally comprise a first metal disc 49 and a second metal disc 50 having substantially different coefficients of expansion, which are bonded along their mating surfaces by any convenient method.

The heater means or element 47, in the embodiment illustrated, is a film of insulating material having a resistive element deposited on it, and enclosed in a second film of insulating material. The material is provided with spaced openings in it so that the material may be folded upon itself for interleaving with the discs 46. The electrically operable means 45 is similar to that disclosed in the above referenced United States Behr application, Ser. No. 761,921, filed Jan. 21, 1977. Details of the electrically operable means 45 structure not set out herein are intended to be incorporated by reference. The discs 46 and heater means 47 are mounted over the end 25 of the shaft 24, between a stop 37 and a support 38. The stop 37 again may comprise a conventional threaded fastener attached to complimentary threads formed along the end 25 of the shaft 24.

As indicated, a pair of terminals 21 and 22 extend through the cover 4. The terminals 21 and 22 are electrically connected to the heater means 47 along suitable conductors 39.

Operation of the valve 2 is relatively simple to understand. The inlet 7 is connected to a source of high pressure while the outlet 8 is connected to a region of lower pressure. In air conditioning systems, the high pressure source conventionally is a hermetic compressor which forces high pressure fluid through a condenser coil and then through the valve, while the low pressure region is an evaporator coil having a first end operatively connected to the valve 2 and a second end connected to the suction or low pressure side of the compressor. The terminals 21 and 22 are connected to a suitable control means, not shown. As indicated, a suitable control means may be employed to sense predetermined conditions within the system in which the valve 1 finds application, and to regulate electrical input to the heater means 47 based on the sense condition or conditions. The piston assembly 23 is positioned within the chamber 14 and is movable toward and away from the opening 11, resulting in a variable port opening for the valve, depending on the position of the piston assembly 23. Spring 35 operates between the wall 36 and the stop 34 to bias the piston assembly 23 toward a closed position. Due to the balanced condition of the piston assembly, the absolute value of the high pressure side at the inlet 7 does not affect the movement of the piston assembly 23. That is to say, the loose fit between the plunger 27 and the chamber part 15 permits high pressure fluid to surround the plunger 27, balancing the fluid forces acting in the plunger.

Fluid flow to the chamber part 16 is generally prevented by the seal 33. Should any of the high pressure fluid enter the chamber 16, it is vented to the low pressure outlet 8 side of the valve 1 via the passageway 18 and orifice 19.

The piston assembly 23 is moved against the bias of the spring 35 by the heat motor 20. Upon receipt of electrical signals from a suitable control circuit, electrical energy is delivered to the heat motor 20. The heater means 47 dissipates the electrical energy input as heat. The relation of the heater means 47 and the disc 46 causes the application of heat to the bimetal discs 49 and 50. Because of their differing coefficients of expansion, the discs expand at different rates and attend to become bow shaped, the bow occuring in the axial direction of the shaft 24. This expansion of the discs 49 and 50 causes the shaft 24 to move away from the end 10 of the partition 9, opening the valve. Continued monitoring of the system in which the valve 1 is employed enables a suitable control circuit to change the electrical input to the heat motor 20 continuously, permitting the valve to seek an operating position that depends upon system operation. In any event, the piston assembly 23 operates completely under the control of the heat motor 20. The balanced fluid pressure conditions provided by the chamber parts 15 and 16 ensures that the piston assembly 23 essentially is free floating, except for the force exerted on it by the spring 35 and heat motor 20.

Figure 2:
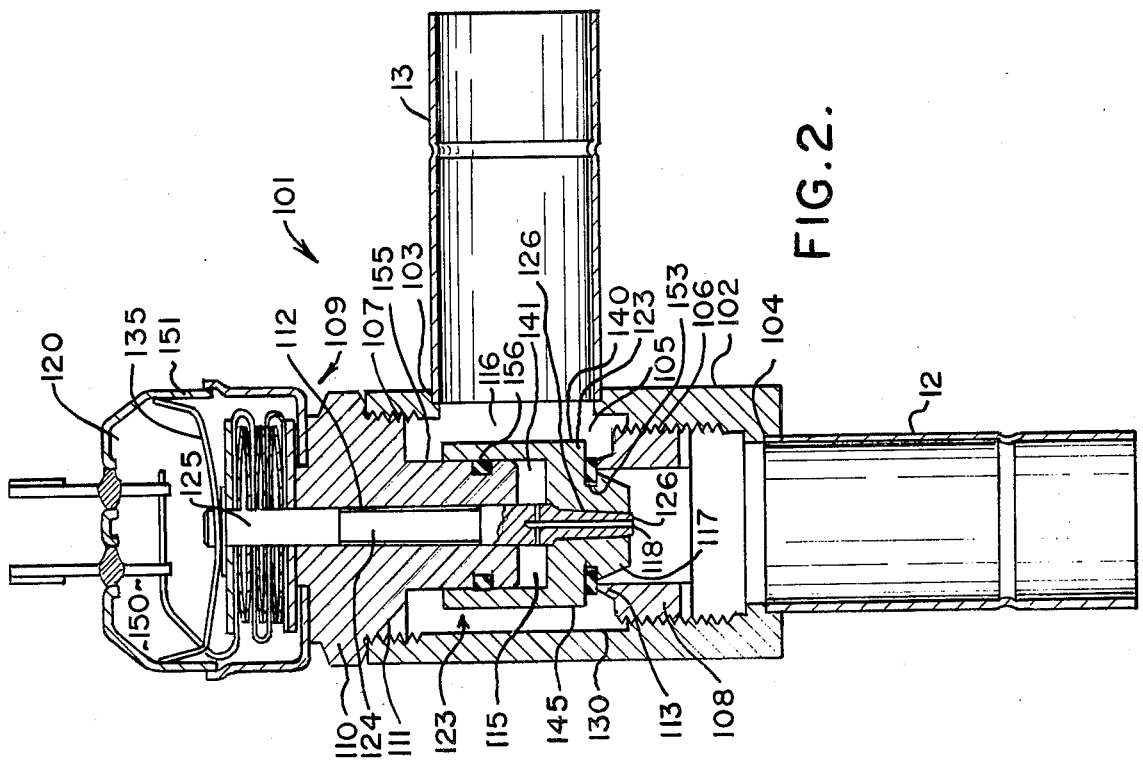
FIG. 2 is a sectional view of a second embodiment of valve of this invention.

A second embodiment of valve of this invention is shown in FIG. 2. As there illustrated, a valve 101 includes a valve body 102. The valve body 102 has a first opening 103 and a second opening 104 formed in it. A passage 130 extends between the openings 103 and 104. The valve body 102 includes an internal wall 105 having a threaded portion 106 on the opening 104 side of the valve, and a threaded portion 107 on the axially outboard side of the opening 103. The threaded portion 106 receives a restriction 108 in a conventional manner. Restriction 108 has an end 113 which functions as a valve seat for a piston assembly 123, defined in greater detail hereinafter.

The tube stubs 12 and 13 are attached to the valve body 102 along the openings 104 and 103 respectively. Attachment may be accomplished in any convenient method. Once again, brazing works well, for example.

The threaded portion 107 of the body 102 receives a heat motor assembly 109. The assembly 109 includes a heat motor 120 and a fitting 110. Fitting 110 includes a fastener 111 having a threaded portion intermountable with the threaded portion 107 of the valve body 102. The fitting 110 also has an axial opening 112 in it, sized to receive a shaft 124 of the piston assembly 123.

The shaft 124 has a first end 125 and a second end 126. The end 125 has the heat motor 120 attached to it. Heat motor 120 is substantially similar to the heat motor 20 described in conjunction with the embodiment of FIG. 1, and is not described in detail. In the embodiment of FIG. 2, however, a spring 135 is positioned with a chamber 150 defined by a casing 151 of the heat motor 120. Spring 135 preferably is a leaf spring, in contradistinction to the coil compression spring shown in FIG. 1. The casing 151 is attached to the fitting 110 by any convenient method.

A reduced diameter portion 155 of the fitting 110 has a seal 156 mounted to it. The piston assembly 123 is mounted to the portion 155 of the fitting 110. Piston assembly 123 includes the shaft 124 and a piston section 140 having a receptacle 141 formed in it. In the illustrated embodiment, the piston section 140 is cylindrical. The receptacle 141 is sized to receive the reduced diameter portion 155 of the fitting 110 in a tight, friction fit. When the piston section 140 of the piston assembly is mounted on the reduced diameter portion 155 of the fitting 110, the parts define a first chamber part 115. The end 126 of the shaft 124 has a vent passage 118 formed in it, which communicates with the chamber part 115, connecting the chamber part 115 to the inlet or opening 104 side of the valve.

An outer wall 145 of the section 140 has an annular groove 153 formed in it, delimited by the separation between the section 140 and a frusto-conical point 117 of the piston assembly 123. A seal member 129 is mounted within the groove 153 and is sized diametrically so that the member 129 abuts the restriction 108 in the enclosed position of the valve 101, such position being illustrated in FIG. 2. The area within the valve body 102 surrounding the piston assembly 123 on the opening 103 side of the restriction 108 defines a second chamber part 116. As shown in FIG. 2 chamber part 116 communicates with the outlet stub 13 of the valve 102.

In operation, the chamber part 115 generally is at the same pressure as the opening 104, due to the vent passage 118 communication between the chamber part 115 and the opening 104. This creates an approximate equal force on both sides of the piston section 140 of the piston assembly 123. The chamber part 115 is isolated from the pressure in the chamber part 116 by means of the seal 156. This balanced condition permits use of a smaller active force to move the piston 123 in relation to the end 113 of the restriction 108. The spring 135 is provided to ensure a positive force is exerted toward the closed position of the valve, regardless of the pressures present at the valve inlet and outlet. Since the chamber part 115 is at the approximate same pressure as the opening 104, and the pressure in the chamber part 115 is isolated from the pressure in the chamber part 116, either of the stubs 12 and 13 may be connected to the high pressure side of the system, as flow through the valve 102 may occur in either direction through the restriction 108 without adverse reaction in valve operation.

As indicated above, the temperature feedback sensor 81 may be incorporated with the heat motors for either of the valve embodiments shown, the sensor 81 only being illustrated with respect to the embodiment of FIG. 1. The feedback sensor 81 is desirable in cases where large variations in ambient or fluid temperatures are encountered. If the feedback sensor is used, the control circuit functions to drive the bimetal temperatures to some value as a function of the refrigeration system parameters monitored. This makes the valve a truly proportional control element, immune to variations in fluid or ambient temperatures. The feedback sensor also permits a faster response when a change in valve positions as required.

Numerous variations, within the scope of the appended claims, will be apparent to those skilled in the art in light of the foregoing description and accompanying drawings. Thus, the silhouette of the valve may vary in other embodiments of this invention. While particular structural arrangements are illustratively as preferred, others structural combinations may be utilized, if desired. The number of bimetallic or heater elements used in conjunction with the heat motor, and their relative position with respect to one another may vary in embodiments of this invention. Those skilled in the art will recognize that the embodiment of FIG. 2 may be modified so that the restriction 108 is movably mounted along the threaded portion of the valve body 102, movement of the restriction 108 upward or downward on the threaded portion 106, as referenced to FIG. 2, changing the bias force of the spring 135 to varying the operating point of the valve. These variations are merely illustrative.

Having thus described the invention, what is claimed and desired to be secured by Letters Patent is:

1. A valve, comprising:
   a valve body having an inlet, an outlet, a main flow passageway between said inlet and said outlet, and a valve seat in said passage, one of said outlet and said inlet being at relatively lower pressure than the other of said inlet and said outlet;
   a piston assembly including a shaft mounted for movement with respect to said valve seat, said piston assembly including means for closing said valve;
   means defining a first chamber part on one side of said valve seat;

means for defining a second chamber part on the same side of said valve seat as said first chamber part;
means for connecting one of said first and said second chamber parts with one of said inlet and said outlet;
means for connecting the other of said first and said second chamber parts with the other of said inlet and said outlet;
means for biasing said piston toward a closed position;
heat motor means mounted to said valve body and operatively connected to said piston, said heat motor means comprising a plurality of heater elements and a plurality of disc pairs mounted in heat transfer relationship with one another, expansion of said discs in one direction acting to move said piston assembly toward an open position;
means at least partially carried by said shaft to prevent migration of flow to said heat motor so that operation of said valve is independent of the fluid variables carried by the valve, said last mentioned means including at least one flow path connectable between one of said first and second chambers and the relatively lower pressure at one of said inlet and said outlet, said means for defining said first chamber part comprises a top plate mounted to said valve body, said top plate including a chamber having first and second diametric sections for delimiting said first and second chamber parts, said piston assembly including a shaft, a piston mounted to a first end of said shaft, said piston being carried in said first chamber part, and seal means carried on said shaft and in said second chamber part, said seal means preventing fluid communication between said first and second chamber parts, said seal means and said low pressure connectable flow path comprising said migration preventing means.

2. The valve of claim 2 wherein said first chamber part communicates with said inlet along the periphery of said piston.

3. The valve of claim 2 wherein said low pressure connectable flow path is formed in said top plate.

4. The valve of claim 3 including spring means mounted in said second chamber part and biased between said top plate and said piston assembly.

5. A valve, comprising;
a valve body having an inlet, an outlet, a main flow port between said inlet and said outlet, and a first chamber part about said main flow port on the inlet side of said main flow port;
a top plate mounted on said valve body;
piston means mounted for movement in said valve body between a first position closing said main flow port and a second position opening said main flow port, said piston means being free fitting in said first chamber part to permit fluid flow from said inlet to said first chamber part in the closed position of said valve;
a seal on said piston means defining with said top plate a second chamber part axially aligned with said first chamber part but spaced axially therefrom;
means for interconnecting said second chamber part with the outlet of said valve body, said outlet being at low pressure with respect to said inlet;
spring means in said second chamber part for biasing said piston toward said closed position;
heat motor means mounted to said top plate; said heat motor means being operatively connected to said piston means, said heat motor means comprising a plurality of heater elements and a plurality of disc pairs mounted in heat transfer relationship with one another, expansion of said discs in one direction acting to move said piston means toward an open position, said seal and said second chamber part interconnecting means defining means for preventing migration of flow to said heat motor means so that operation of said valve is independent of fluid variables carried by the valve, said top plate including a chamber having first and second diametric sections for delimiting said first and second chamber parts, said piston assembly including a shaft, a piston mounted to a first end of said shaft, said piston being carried in said first chamber part, and seal means carried on said shaft and in said second chamber part, said seal means preventing fluid communication between said first and second chamber parts, said seal means and said means for interconnecting said low pressure including said migration preventing means.

6. The valve of claim 5 wherein said means for interconnecting said second chamber part with the outlet of said valve body comprises a passage formed in said valve extending between said second chamber part and the outlet side of said valve body.

* * * * *

UNITED STATES PATENT AND TRADEMARK OFFICE
CERTIFICATE OF CORRECTION

PATENT NO. : 4,239,177
DATED : December 16, 1980
INVENTOR(S) : Steven E. Williams et al It is certified that error appears in the above—identified patent and that said Letters Patent are hereby corrected as shown below:

Column 1, line 43, "on" should be "in".
Column 3, line 46, "eng" should be "end".

Column 7, line 38, "claim 2" should be "claim 1".
Column 8, line 20, ";" should be ",".

Signed and Sealed this

Sixth Day of October 1981

[SEAL]

Attest:

GERALD J. MOSSINGHOFF

Attesting Officer    Commissioner of Patents and Trademarks